Patented Sept. 10, 1929.

1,727,675

UNITED STATES PATENT OFFICE.

DONALD W. ROSS AND JAMES M. LAMBIE, OF WASHINGTON, PENNSYLVANIA.

METHOD OF REPAIRING REFRACTORY WALLS.

No Drawing. Application filed July 27, 1925, Serial No. 46,498. Renewed April 12, 1929.

Our invention relates to a method of repairing and patching walls of pots and tanks for containing molten glass, and interlocking the blocks which are employed in building glass tanks and the like.

It is well known that the side walls of glass tanks or furnaces required frequent renewal by reason of the difficulty in obtaining wall-forming material therefor, of such character that it will satisfactorily withstand the high temperatures and fluxes to which it is necessarily subjected. The side walls of tanks require more frequent renewal than do the bottom walls thereof. However, holes and fissures develop in the bottom wall which is commonly composed of a plurality of tank blocks. Frequently, perhaps only a few of these blocks of the bottom wall require renewal and, according to the present practice, it is sometimes necessary to tear up and replace practically the entire bottom of the furnace, even though only a few of the blocks are damaged. While our invention is particularly useful in connection with the bottom walls of glass tanks and the like it may be advantageously employed in connection with any refractory wall.

Our invention may also be advantageously employed in connection with the patching of flat or suspended arches, and furnace linings in general.

One object of our invention is to provide a method whereby patching material or mortar will be more firmly held in position against the surfaces to which they are applied, thus preventing dislodgment thereof either by breaking loose and floating in the glass or by disintegration through contact with the glass.

In practicing our invention we provide a mixture that is relatively heavy per unit volume, so that when used to patch the bottom of a tank, for instance, it will not pull loose from the recess that has been filled thereby and rise to the surface of the glass. Such mixture may contain a large proportion of cyanite or corundum, or both, which have specific gravities of approximately 3.6 and 4.1, respectively. Mullite formed from these materials, as hereinafter explained, will be of approximately 3.0 specific gravity.

It is also desirable to provide a mixture which will have a minimum shrinkage during drying, and substantially no shrinkage or a slight expansion under the action of heat, so that no cracks or fissures will develop into which the molten glass may enter and cause disintegration of the material. It is also important that the mixture be of such character that interlocking crystals are developed at moderate temperatures, as by the employment of cyanite or other mullite forming materials, usually in conjunction with fluxing agents, so that the mass will develop a crystalline structure and the bulk of the material will become a substantially homogeneous mixture and which crystals will interlock with the walls of the recess wherein it is placed, whereby the patching material and the wall with which it is to be used will constitute in effect a monolithic structure. Thus after recrystallization and consequent expansion of the crystalline material has taken place, the mix more tightly fits the cavity it is intended to fill than it did before such transformation took place.

Also, the mixture may be advantageously employed in repairing refractory arch brick structures, by filling it into spaces left in the arch by bricks that have fallen therefrom. Such inserted mass or plug of material will develop crystals that interlock with one another and with crystals formed on those surfaces of the arch adjacent to said material.

To form an interlocking mullite structure we may employ a substance containing cyanite or fused alumina or corundum. It is also desirable to employ little or no water, or at least if a bonding clay is employed, to select a clay which is deflocculatable, so that comparatively little water will be required to give the desired degree of fluidity and the mass will not shrink to such an extent on drying that cracks will develop into which the molten mass could find its way and thereby dissolve the material. We further employ a flux, such as lead oxide, glass or feldspar, in connection with the cyanite or other mullite forming material, which flux acts as a liquid phase at high temperatures and accelerates mullite development. The crystals formed thereby assume interlocking relation.

When cyanite is selected as the principal ingredient of the composition, we use cyanite either unfired or calcined, or any desired proportions of unfired and calcined material, preferably of graded sizes so as to form a minimum of interstitial space. With this cyanite we may employ a flux such as lead oxide, glass, feldspar, or other material that under heat will accelerate the development of mullite. This composition may consist of 95% cyanite and 5% of lead oxide, for example.

If the cyanite is finely enough divided and used in sufficient percentage, the mixture, when sufficiently heated, is shot through by a rigid framework of closely interlocking mullite crystals formed from the cyanite and also from certain kinds of clay which may be included in the mix, with the result that the product is very resistant to deformation at high temperatures. It is commonly known that mullite is found in ordinary refractory surfaces exposed to the action of molten glass. Since radiating mullite crystals are developed in firing the mixture herein described, and as these are of the same chemical nature as the mullite crystals that develop in clay refractories, such crystals will interlock with the mullite crystals developed in glass furnace and other clay refractory walls, and our mixture, when applied to crevices in such walls, will develop an interlocking structure therewith tending to form a homogeneous structure as between the patching material and the refractory wall.

The mixture may be deposited in the dry state, in the crevice or recess to be filled, as a material for repairing hot pots, etc., the thin skin of glass on the surface of the part to be repaired serving as a temporary bond until an interlocking crystalline structure is developed therein under the action of heat.

Instead of depositing the mixture in a dry condition it may be moistened with sodium silicate or similar glue material and tamped into place. The sodium silicate serves to hold the material together in the dry state and also furnishes some flux that accelerates mullite development under heat. If desired, two parts of water may be employed to one of sodium silicate to increase the adherence of the mixture after being dried in place.

The material may also be used for coating the inside of glass melting pots, either by being worked on in a plastic condition, or applied in a more fluid state, by means of a brush or by spraying, etc.

Another mixture which may be employed with satisfactory results consists of:

Cyanite, in graded sizes_____ 80 to 85%
Lead oxide_____ 5%
Deflocculatable clay_____ 10 to 15%

The clay in this case is employed as a dry bonding agent for the cyanite. After the addition of water and a deflocculating agent such as sodium hydroxide, .05% to .25%, the mixture may be poured into the place where it is to be used, or in somewhat stiffer form may be used as a mortar between blocks or as a plaster to cover the face of a block, to prevent dissolving thereof.

To accomplish these same results in other cases, we find that it is advantageous to dry-bond the cyanite, lead oxide, etc., with ordinary plastic clay, such as St. Louis Cheltenham clay, together with water.

We may also employ fused alumina or corundum, either in lieu of, or in combination with, the cyanite. In case the fused alumina is employed, we frequently use glass as a flux, or use other fluxing material such as feldspar, that contains sufficient silica so that mullite will form by combination of the alumina with the silica of the flux. Bonding clay may or may not be employed in this mixture. Another satisfactory mixture may be composed of cyanite, fused alumina or corundum, clay, and a flux of either lead oxide or glass or both.

The employment of cyanite as a material for developing mullite is described at length and claimed in our copending application, Serial No. 690,042, filed February 1, 1924.

We prefer to employ cyanite as a mullite forming material, for the reason that cyanite is transformed into mullite and silica glass at lower temperatures than are the other minerals of this class. If, during transformation, the cyanite is in contact with alumina-silicates of the general composition of clay, the mullite arising from it develops as radiating crystals out into the surrounding mass. Furthermore, mullite as a natural material is very scarce and impure while the manufacture of artificial mullite is expensive.

Cyanite, in addition to assuming the form of interlocking crystals when fired, also expands, thereby compensating for or preventing shrinkage of the composition which would otherwise take place under the action of heat. Mullite such as formed from cyanite has heretofore been thought to be of the composition $Al_2O_3SiO_2$ and was called sillimanite. However, it has recently been found to be of the composition $3Al_2O_3 2SiO_2$ and is now known as mullite, to distinguish it from the natural mineral sillimanite.

Cyanite is the optimum material of its class for developing mullite and differs from other materials of similar character in that the mullite developed thereby in clay mixes is in the form of radiating crystals that assume interlocking relation with one another during development. The presence of certain fluxes accelerates the development of the mullite crystals. Fused alumina or corundum, when employed with glass as a flux, form crystals in the same manner, the alumina combining with the silica contained in the flux to form mullite crystals which are arranged radially about the alumina particles, assuming, of course, that the silica content of the flux is sufficiently high to insure mullite formation.

As glass forming materials for use in our mix there are several substances that we prefer to use in varying proportions as, for instance, lead compounds both soluble and insoluble in water, feldspar, hydraulic cements, boric acid and other fluxes, such as compounds of the alkali and alkaline earth metals.

A mixture of lead oxide and lead acetate used as part of the flux content increases the adhesion of the fired mix to the clay wares it is used to protect. This increase in strength is apparent even at relatively low temperatures. This effect is obtained with a minimum amount of fusion of the mix.

Hydraulic cements such as Portland cement used in sufficient quantities in the mix, cause the mix which has been dried in place, to adhere well to the clay wares it is used to protect. On sufficient heating the lime etc. of the cements fluxes the cyanite and similar claylike ingredients of the mix. Either of the cements named may be employed in amounts up to 30% of the mix, in some cases, and in other instances entirely omitted.

Several of the substances we prefer to use as fluxing ingredients also contain considerable percentages of silica, or both silica and alumina, in addition to their fluxing contents of alkali and alkaline earth metals, etc. Such materials on being melted by heat form glasses which on account of their silica and alumina contents favor mullite development in the mixes containing them. Thus many of the commercial glasses contain large percentages of silica and are favorable mediums for development of mullite when used in mixes high in alumina. Sodium silicate also contains considerable silica, while alum contains considerable alumina. Similarly, Portland cement contains considerable percentages, of both silica and alumina, as does the natural mineral feldspar. Feldspar has the further advantage that it is rather heavy per unit volume, will not soften at low temperatures and forms a rather viscous glass at the temperature at which it does soften. We ordinarily prefer to use potash feldspar rather than soda feldspar as it has a longer temperature range in which it is viscous. Thus other mixtures which may be employed for this purpose may consist of:

1. Clay, cyanite, lead oxide, lead acetate.
2. Clay, cyanite, feldspar.
3. Clay, cyanite, feldspar, lead oxide, lead acetate.
4. Cyanite, hydraulic cement.
5. Cyanite, hydraulic cement, lead oxide and lead acetate.

Of course various other combinations of the above materials may also be used. In many of the above mixes corundum may be substituted for cyanite.

A considerable heat treatment is necessary even under favorable conditions, for rapid development of mullite. Glass tank blocks are heated to high temperatures only on the surface of one side, hence it is only near the surface exposed within the furnace that the temperature is ever high enough to insure extensive mullite development in the repair material or mortar for the blocks. To insure development of mullite in and near this surface, the exposed surface of the mix may be highly heated before the furnace is put into regular service, either by heat from the furnace fires themselves, or by semi-fusing of the exposed surfaces of the mix by a high temperature flame, such as an oxy-acetylene flame.

Pure mullite is very refractory, but in case an oxy-acetylene flame is used for fusion purposes, a mortar mixture may be used that has practically the same composition as mullite and which contains little or no fluxing ingredients. If desired, the material may be fused on in successive layers until a layer of the desired thickness is obtained.

We claim as our invention:

1. The method of repairing refractory walls of glass tanks and the like, which comprises providing a mixture of granular aluminous material, a flux and a bonding clay, applying such mixture to the glass engaging surfaces of said walls before firing, and heating the resulting structure to the point where mullite crystals are formed.

2. The method of repairing refractory walls of glass tanks and the like, which consists in providing a refractory mixture containing clay and another mullite-forming material, applying said material while in plastic condition to said walls, and subjecting the same to the action of heat.

3. The method of repairing walls of glass tanks and the like which consists in applying thereto a refractory substance having greater specific gravity than that of molten glass.

4. The method of filling recesses in refractory walls of glass tanks and the like, which consists in applying thereto a plastic mixture which will develop radiating crystals upon being heated, and subjecting said mixture to the action of heat.

5. The method of repairing the walls of glass tanks and the like which consists in applying thereto a mixture containing corundum and silica, applying said mixture to a tank wall, and firing to a point where an interlocking crystalline structure is detectable by the use of a microscope.

6. The method of repairing refractory walls for use against glass which comprises applying a mixture of corundum and clay to the parts requiring repair.

7. The method of repairing refractory walls, which comprises applying a mixture of an aluminous material that will expand on being fired and glass, to the parts requiring repair.

8. The method of repairing refractory walls, which comprises applying a mixture of an aluminous material that will expand on being fired and the raw materials of a glass batch to the parts requiring repair.

9. The method of repairing refractory walls, which comprises applying a mixture of a highly aluminous material and a glass or raw glass batch high in silica to the parts requiring repair.

10. The method of repairing refractory walls of glass tanks and the like, which consists in providing a refractory mixture containing a mullite forming material, applying said material to said walls, and semi-fusing it to them, by means of an oxy-acetylene flame or the like.

11. The method of repairing refractory walls, which comprises applying a mixture of an aluminous material that will expand on being fired and lead oxide to the parts requiring repair.

12. The method of repairing refractory walls, which comprises applying a mixture of an aluminous material that will expand on being fired, clay and lead oxide to the parts requiring repair.

13. The method of repairing refractory walls, which comprises applying a mixture of highly aluminous material, lead oxide and lead acetate to the parts requiring repair.

14. The method of repairing refractory walls, which comprises applying a mixture of highly aluminous material, an insoluble lead compound and a water soluble lead compound to the parts requiring repair.

15. The method of laying up glass tank blocks and the like which comprises providing a refractory mortar containing clay and another mullite forming material, applying said material in the joints between the blocks and subjecting the same to the action of heat.

16. The method of coating or repairing refractory walls, which comprises providing a refractory mortar containing mullite forming material and applying this material in slip form by spraying it upon the surface being treated.

17. The method of coating or repairing refractory walls, which comprises providing a refractory mortar containing a mullite forming material, applying this material in successive layers to the surface being treated and semi-fusing each layer on, by use of an oxy-acetylene flame or the like, before the next layer is applied.

18. The method of repairing refractory walls which comprises applying thereto a mixture of a granular aluminous material which will expand on being fired, and clay, and heating the resulting structure to the point where mullite crystals are formed.

19. The method of repairing refractory walls for use against molten glass, which comprises applying a mixture containing corundum, a material that expands on firing, and clay, to the parts requiring repair, the expanding material on being heated serving to at least partially compensate for the shrinkage of the other ingredients.

20. The method of repairing refractory walls for use against molten glass, which comprises applying a mixture containing graded grains of corundum, and clay, to the parts requiring repair.

21. The method of repairing refractory walls for use against molten glass, which comprises applying thereto a mixture containing graded grains of corundum, and deflocculated clay, to the parts requiring repair.

In testimony whereof we, the said JAMES M. LAMBIE and DONALD W. ROSS, have hereunto set our hands.

JAMES M. LAMBIE.
DONALD W. ROSS.